United States Patent Office 3,501,495
Patented Mar. 17, 1970

3,501,495
N-PHENYLSULPHONYL-N'-(3-AZABICYCLO-ALKYL) UREA DERIVATIVES
Laszlo Beregi, Boulogne-sur-Seine, Pierre Hugon, Rueil-Malmaison, and Jacques Duhault, Suresnes, France, assignors to Science Union et Cie, Societe Francaise de Recherche Medicale, Suresnes, France, a French society
No Drawing. Filed Jan. 25, 1967, Ser. No. 611,584
Claims priority, application Great Britain, Feb. 10, 1966, 5,870/66
Int. Cl. A61k 27/00; C07d 41/02, 29/02
U.S. Cl. 260—326.3
9 Claims

ABSTRACT OF THE DISCLOSURE

N-arylsulphonyl-N'-(3-azabicycloalkyl) ureas wherein the aryl group represents a phenyl radical substituted by a halogen atom or a lower alkyl radical, and the bicycloalkyl group represents a bicyclohexyl, a bicycloheptyl or a bicyclooctyl radical.

These compounds possess hypoglycemic properties, and they are used perorally in the treatment of diabetes mellitus.

---

The present invention provides N-arylsulphonyl-N'-(3-azabicycloalkyl) urea derivatives represented by the Formula I:

$$X\text{—}\underset{}{\bigcirc}\text{—}SO_2\text{—}NH\text{—}CO\text{—}NH\text{—}N\overset{}{\underset{}{\diamondsuit}}(CH_2)_n \qquad (I)$$

wherein:

X is a substituent selected from the group consisting of: halogen, e.g., chloro, bromo, or fluoro, and a lower-alkyl radical of 1 to 5 carbon atoms inclusive, e.g., methyl, ethyl, propyl, isopropyl, butyl, secondary butyl, tertiary butyl and amyl, and n is 1 to 3, inclusive.

The general Formula II $$-N\overset{}{\underset{}{\diamondsuit}}(CH_2)_n \qquad (II)$$

represents the following 3-aza-bicyclo alkane radicals of Formula III, IV or V:

(III) azabicyclohexyl    (IV) azabicycloheptyl    (V) azabicyclooctyl

The invention also includes the salts, especially the physiologically tolerable salts, of the above compounds.

The N-arylsulphonyl-N'-(3-azabicycloalkyl) ureas of the present invention are new compounds and can be prepared by reacting an arylsulphonyl urethane with an N-amino-3-azabicyclo alkane, according to the process disclosed by Marshall et al., J. Org. Chem. 23, 927 (1958), the said N-amino-3-azabicyclo alkane having the general Formula VI:

$$H_2N\text{—}N\overset{}{\underset{}{\diamondsuit}}(CH_2)_n \qquad (VI)$$

wherein n has the same meaning as earlier specified.

The N-amino-3-azabicyclo alkanes used as starting material were prepared by means of the process of J. B. Wright—R. E. Willette, J. Med. and Pharm. Chem. 5, 819 (1962), which involves nitrosating a 3-azabicyclo alkane and reducing the resulting N-nitroso derivative with lithium aluminum hydride.

The 3-azabicyclo alkanes employed in this invention may be obtained by transforming respectively the known cyclopentane, cyclobutane and cyclopropane dicarboxylic acids into imides by the method of H. Najer—R. Giudicelli, Bull. Soc. Chim., France, 1593 (1962) and finally submitting the imides to reduction by means of lithium aluminium hydride, following the method described by R. Griot, Helv. Chim. Acta. 42, 67 (1959).

The compounds of the invention may be readily obtained in the form of their salts with suitable acids, especially acids yielding physiologically tolerable salts. Among the acids that may be used, hydrochloric, hydrobromic, sulphonic, methanesulphonic, acetic, malonic, maleic, fumaric, tartaric and malic acids may be mentioned.

The present invention also includes salts formed with alkali metal hydroxides, alkaline earth metal hydroxides, alkali metal carbonates, alkaline earth metal carbonates and alkali metal bicarbonates.

The new compounds of the present invention, and their physiologically tolerable salts, possess valuable therapeutic properties, especially, hypoglycemic properties. They may be used as medicaments, active perorally, in the treatment of diabetes mellitus.

Their toxicity is very low, and the $LD_{50}$ studied in mice is superior to 3 g./kg. P.O., for all the compounds tested.

The blood sugar lowering activity of the compounds of the invention was studied orally in the rat and rabbit. The minimum effective dose is situated between 1 and 10 mg./kg., and a reduction of the blood sugar level of 30% was obtained with doses varying from 2.5 to 25 mg./kg.

In comparison, chlorpropamide, a known antidiabetic, has to be administered at the dose of 50 mg./kg. in the rat to obtain the same effect, and the $LD_{50}$ of this product is 1 g./kg., that means 3 times more toxic than the new compounds of the present invention.

These new compounds may be administered to patients suffering from diabetes, in various pharmaceutical forms, such as tablets, dragees, capsules for oral administration in admixture or conjunction with the usual pharmaceutical carriers, as for example, talc, starch, lactose or magnesium stearate.

The doses can vary from 25 to 250 mg., preferably from 50 to 150 mg., per day.

The following examples illustrate the present invention, all parts being by weight and melting points being determined by the Kofler method.

EXAMPLE 1

N-(4-methylbenzenesulphonyl)-N'-(3-azabicyclo (3.3.0)-3-octyl) urea $$H_3C\text{—}\underset{}{\bigcirc}\text{—}SO_2\text{—}NH\text{—}CO\text{—}NH\text{—}N\overset{}{\underset{}{\diamondsuit}}$$

To a suspension containing 4.86 parts of 4-methylbenzene-sulphonyl urethane (M.P. 80–82° C.) and 36 parts of anhydrous toluene there are rapidly added 2.5 parts of N-amino-3-azabicyclo (3.3.0) octane (B.P./ 18 mm.=86° C.). The reaction mixture is heated under reflux for 1 hour. The resulting clear solution crystallizes on cooling. The crystals are filtered, washed with 2 parts of toluene, then recrystallized from anhydrous ethanol. There are obtained 3.8 parts of the desired product, M.P. 180–182° C.

To a solution containing 10.3 parts of this product dissolved in 100 parts of methanol, maintained at 45° C., are added 30 parts of a methanolic solution containing 4 parts of KOH in pellets. The resulting solution is concentrated in vacuo to 20 parts followed by the addition of 50 parts anhydrous ethanol and allowed to stand until crystallization of the desired salt occurs. There are obtained 8.5 parts of the potassium salt, M.P. 255–260° C. (micro-Kofler).

In the same manner, the use of lithium hydroxide or sodium hydroxide in place of the potassium hydroxide employed above, affords the corresponding lithium or sodium salt.

EXAMPLES 2–9

In the same manner as described in Example 1, the following sulphonylurea compounds are obtained from the following starting materials:

(2) N-(4-ethylbenzenesulphonyl) - N' - (3-azabicyclo (3.3.0)-3-octyl) urea, M.P. 149° C. (ethyl alcohol), starting from 4-ethylbenzenesulphonyl urethane and N-amino 3-azabicyclo (3.3.0) octane.

(3) N-(4-chlorobenzenesulphonyl) - N' - (3-azabicyclo (3.3.0)-3-octyl) urea, M.P. 207–208° C. (ethyl alcohol), starting from 4-chlorobenzenesulphonyl urethane (M.P. 92–93° C.) and N-amino 3-azabicyclo (3.3.0) octane.

(4) N-(4-bromobenzenesulphonyl)-N'-(3 - azabicyclo (3.3.0)-3-octyl) urea, M.P. 213° C. (toluene), starting from 4-bromobenzenesulphonyl urethane (M.P. 88–90° C.) and N-amino 3-azabicyclo (3.3.0) octane.

(5) N-(4 - methylbenzenesulphonyl) - N' - (3 - azabicyclo (3.2.0)-3-heptyl) urea, M.P. 228–230° C. (dimethyl formamide/water), starting from 4-chlorobenzenesulphonyl urethane and N-amino 3-azabicyclo (3.2.0) heptane.

Its methanesulphonic acid salt is prepared by dissolving separately in ethanol an equimolar amount of both the urea and the methane—sulfonic acid, mixing the two solutions and allowing it to stand until crystallization (M.P. 195–200° C. with decomposition).

(6) N - (4 - ethylbenzenesulphonyl)-N'-(3-azabicyclo (3.2.0) 3-heptyl) urea, M.P. 200–201° C. (ethyl alcohol), starting from 4-ethylbenzenesulphonyl urethane and N-amino 3-azabicyclo (3.2.0) heptane.

(7) N - (4 - chlorobenzenesulphonyl)-N'-(3-azabicyclo (3.2.0) - 3 - heptyl) urea, M.P. 234–236° C. (dimethyl formamide water), starting from 4-chlorobenzenesulphonyl urethane and N-amino 3-azabicyclo (3.2.0) heptane.

(8) N - (4-methylbenzenesulphonyl)-N'-(3-azabicyclo- (3.1.0)-3-hexyl) urea, M.P. 206–207° C. (dimethyl formamide/water), starting from 4-methylbenzenesulphonyl urethane and N-amino 3-azabicyclo (3.1.0) hexane.

(9) N - (4 - fluorobenzenesulphonyl)-N'-(3-azabicyclo (3.3.0)-3-octyl) urea, starting from 4-fluorobenzenesulphonyl urethane and N-amino 3-azabicyclo (3.3.0) octane.

What we claim is:

1. A compound selected from the group consisting of (A) N-arylsulphonyl-N'-(3 - azabicycloalkyl) ureas of the formula:

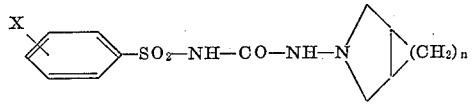

wherein:

X is a substituent selected from the group consisting of: halogen selected from the group consisting of chlorine, fluorine and bromine and, lower-alkyl of 1 to 5 carbon atoms inclusive, and $n$ is 1 to 3, inclusive, and (B) physiologically tolerable addition salts thereof.

2. A compound of claim 1 which is N-(4-methylbenzenesulphonyl)-N'-(3-azabicyclo (3.3.0)-3-octyl) urea.

3. A compound of claim 1 which is N-(4-ethylbenzenesulphonyl)-N'-(3-azabicyclo (3.3.0)-3-octyl) urea.

4. A compound of claim 1 which is N-(4-chlorobenzenesulphonyl)-N'-(3-azabicyclo (3.3.0)-3-octyl) urea.

5. A compound of claim 1 which is N-(4-bromobenzenesulphonyl)-N'-(3-azabicyclo (3.3.0)-3-octyl) urea.

6. A compound of claim 1 which is N-(4-methylbenzenesulphonyl)-N'-(3-azabicyclo (3.2.0)-3-heptyl) urea.

7. A compound of claim 1 which is N-(4-ethylbenzenesulphonyl)-N'-(3-azabicyclo (3.2.0)-3-heptyl) urea.

8. A compound of claim 1 which is N-(4-chlorobenzenesulphonyl)-N'-(3-azabicyclo (3.2.0)-3-heptyl) urea.

9. A compound of claim 1 which is N-(4-methylbenzenesulphonyl)-N'-(3-azabicyclo (3.1.0)-3-hexyl) urea.

References Cited

Chemical Abstract of Netherlands Patent 6,500,007, July 12, 1965.

ALEX MAZEL, Primary Examiner

B. I. DENTZ, Assistant Examiner

U.S. Cl. X.R.

260—293.4; 424—267, 274

UNITED STATES PATENT OFFICE
CERTIFICATE OF CORRECTION

Patent No. 3,501,495            March 17, 1970

Laszlo Beregi et al.

It is hereby certified that errors appear in the above-identified patent and that said Letters Patent are hereby corrected as shown below:

Column 3, line 30
Appl. Page 5, line 8    :  "4-chlorobenzenesulphonyl"

should read

--- 4-methylbenzenesulphonyl ---

SIGNED AND
SEALED
AUG 25 1970

(SEAL)
Attest:

Edward M. Fletcher, Jr.
Attesting Officer

WILLIAM E. SCHUYLER, JR.
Commissioner of Patents